United States Patent [19]

Sciaky

[11] 3,993,858

[45] Nov. 23, 1976

[54] DIRECT CURRENT PORTABLE GUN WELDER SYSTEM

[75] Inventor: David Sciaky, Chicago, Ill.

[73] Assignee: Welding Research, Inc., Chicago, Ill.

[22] Filed: Dec. 18, 1974

[21] Appl. No.: 533,769

[52] U.S. Cl. ............................ 174/15 WF; 174/27; 174/103; 174/117 R
[51] Int. Cl.² ...................... H01B 7/34; H01B 7/22
[58] Field of Search ............... 174/15 C, 15 WF, 27, 174/103, 105 R, 117 R, 117 F; 219/90, 108

[56] References Cited

UNITED STATES PATENTS

| | | | |
|---|---|---|---|
| 1,884,570 | 10/1932 | Chapman | 174/15 WF |
| 3,392,257 | 7/1968 | Glorioso | 219/109 X |
| 3,694,563 | 9/1972 | Monds et al. | 174/105 R X |
| 3,825,717 | 7/1974 | Hughes, Jr. | 219/108 X |

FOREIGN PATENTS OR APPLICATIONS 575,660   2/1946   United Kingdom............ 174/15 WF Primary Examiner—Arthur T. Grimley
Attorney, Agent, or Firm—Julius L. Solomon

[57] ABSTRACT

Portable direct current resistance welding apparatus incorporating a flexible cable assembly comprising a pair of flexible conductors maintained at a fixed distance from one another with restraining means which prevent the separate cables from moving one with respect to the other. A flexible sleeve holds the conductors in parallel relationship to one another at a distance of at least four inches by means of a multiplicity of separating and restraining means fastened to the sleeve at intervals along its length while retaining full flexibility in the cable assembly.

1 Claim, 5 Drawing Figures

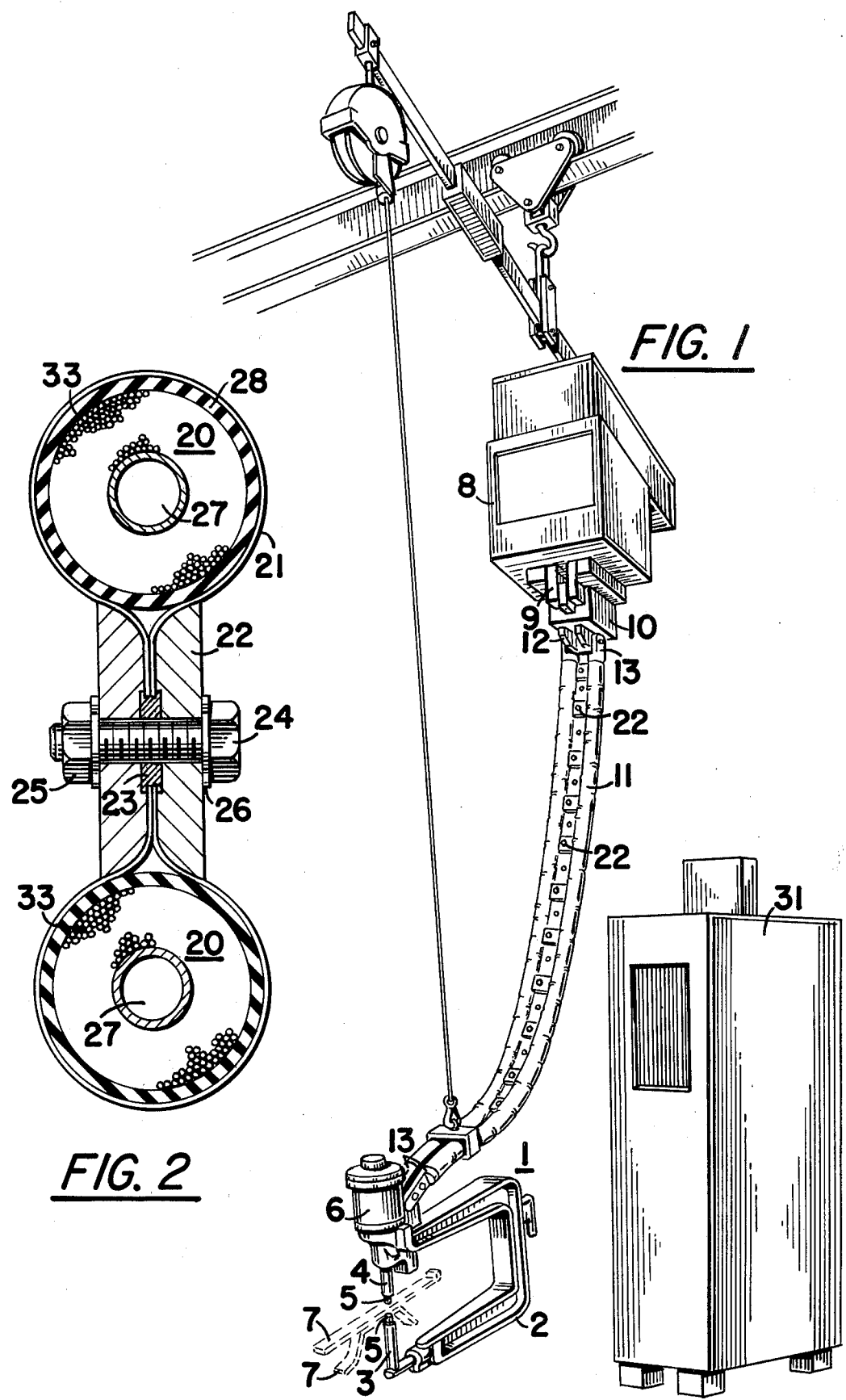

DIRECT CURRENT PORTABLE GUN WELDER SYSTEM

This invention relates to portable gun welding systems and, in particular, to an improved secondary conductor system for a portable gun welding system utilizing direct current in the secondary circuit. Traditionally, portable resistance welding gun systems are fed from a single phase power supply line. The 460 volt power supply line is stepped down in a single phase transformer whose secondary is arranged to generate the low voltages required to feed the secondary circuit comprising the portable resistance welding gun and flexible cable.

Portable welding systems of this type are used commonly in automotive plants for the fabrication of automobile bodies which are fabricated of twenty gage 0.040 inch mild steel and truck bodies fashioned from heavier gages. In some sections of the body twelve gage 0.109 inch material is utilized. A welding current of approximately 17,600 amperes is sufficient to weld the heaviest of these gages of mild steel. Because of the relatively low welding current requirements for the welding of mild steel, portable resistance welding equipment utilizing flexible low reactance kickless cables having a copper section of approximately 300,000 circular mills may be utilized with the result that the gun and cable can be easily handled for long periods of time by an operator without undue fatigue. Recently, because of the energy crisis, it has become desirable to lower the weight of automobiles in order to decrease gasoline consumption and steps are being taken to substitute aluminum for steel in fabricating the bodies and structures of automobiles and trucks. The welding of aluminum rather than steel presents a problem, however, inasmuch as the current required to weld aluminum is much greater than that required for the welding of steel of like gage. For example, to weld one tenth inch aluminum requires the passage of 50,000 amperes welding current for a period of 1/6 of a second - more than three times the current required to weld 0.109 inch mild steel. This would require, for the same heat dissipation per unit length, a cable having a cross sectional area of approximately two and one-half times that required in the welding of the mild steel at the same production rate. The cables normally utilized in conjunction with portable welding equipment are of the "kickless" type which is designed to minimize inductive reactance. This cable is made in interwoven coaxial fashion and has two conducting paths, a center stranded conductor of, let us say, 300,000 circular mills surrounded by several stranded conductors totaling 300,000 circular mills in area which are tied together and the group insulated from the center conductor. Another low reactance cable configuration of conductors in wide use today is the arrangement of six flexible stranded conductors arranged around a center core spacer. Alternate conductors are connected together to form an interleaved structure comprising two groups of three conductors each insulated from one another, the assembly of conductors being twisted about its longitudinal axis and covered with an insulating abrasion resistant waterproof sleeve. The close spacing between adjacent conductors of opposite polarity and the twist in the cable results in a pair of conductors which presents a low reactance to the alternating current. Means are provided for passing water through the cable to remove the heat which is developed by the high currents which pass through the conductors. The concentric or twisted pair configuration of the two cables measureably reduces the impedance of the cable and this, of course, reduces the voltage drop across the cable and the KVA demand required from the power supply system. The use of alternating current for welding mild steel has proved to be satisfactory, however when it is necessary to weld aluminum it is desirable to utilize direct current for welding for several reasons. One, when utilizing an alternating current for the welding of aluminum it is found that the electrodes, by which the current is passed through the materials being welded, pick up material at the point of contact of the electrode and the aluminum. This aluminum coating on the tip of the electrode results in inconsistencies in the strength of the welds produced. As is well known, the peak value of a sinosoidal wave is 1.414 times the RMS value which represents the heating effect of the alternating current. These high peak currents accelerate the buildup of the aluminum coating on the tip face making it necessary to stop production on the machine periodically in order to remove the aluminum picked up on the copper tips. Two, it has been found, that aluminum could be very readily welded by the use of a unidirectional pulse of current as is obtained in the secondary of a three phase single phase type of welding machine as is described in U.S. Pat. No. 2,415,708 dated Feb. 11, 1947, or U.S. Pat. No. 2,431,083 dated Nov. 18, 1947. In welding aluminum using the wave forms illustrated in the above patents is has been found that the peak currents required to weld aluminum are much lower than those required when using alternating current since the unidirectional pulse, because of its essentially square wave form, has a peak value which is not much greater than the average or heating effect value of the unidirectional pulse. Three, the unidirectional pulse is advantageous for yet another reason because of the nature of the alternating current wave. The alternating current essentially delivers a series of pulses of current which start at zero, reach a maximum value according to a sine function and then return to zero - the current then reversing itself reaching a maximum and again returning to zero. Each half cycle of current is essentially a pulse current which has its greatest heating effect during the time when the half wave is close to the peak value. When the current is returning to zero the heat which has been developed in the work during the peak periods is dissipated into the material being welded. The result is that a still higher RMS and peak current is required in order to make up for the loss of heat during the near zero portion of the current wave form from the area of the spot being welded into the body of the aluminum work piece.

When using a smooth unidirectional pulse of current for welding there is no such loss of heat since there is a continuous increasing development of heat in the area where the spot is being developed. This is true, of course, if the unidirectional current is smooth and without ripple. Should there be ripple then there will be peaks and valleys in the unidirectional pulse with a consequent transfer of heat to the body of the work during each valley.

It has been determined that welding with 60 Hz alternating current requires an RMS current 12 percent greater than the average current required when welding with direct current. Since the power required is proportional to the square of the secondary current the power required when welding with alternating current is 25 percent greater than that required when using D.C. In addition the impedance of the secondary circuit to the flow of alternating current may be several times the resistance of the conductors requiring an even greater KVA demand from the power supply.

Portable resistance welding machines which include rectifiers and which deliver a unidirectional current, have been manufactured in the past which utilize an arrangement as illustrated in FIG. 7 of U.S. Pat. No. 3,495,067 issued Feb. 10, 1970. These machines utilized conventional flexible cables of the concentric type mentioned above. It was, however, found that the secondary current delivered by machines of this kind had a ripple sometimes as much as 100 percent depending upon the length of the cable and the configuration of the welding gun.

It is the purpose of the present invention to allow for the production of a DC portable welding machine which can deliver a unidirectional current with substantially less ripple.

Another object of the present invention is to provide a welding system which overcomes the defects and limitations of previous DC portable welding machines.

Another object is to make possible the manufacture of portable welding cables which at one and the same time act as current carriers and electrical filters to reduce the ripple developed in the rectification system of the welder.

Another object is to allow for the production of flexible current carrying members which are more flexible and easier to maneuver than the conventional concentric flexible cables heretofore used in portable machines.

Another object resides in the provision of a flexible cable having a high inductance and a low resistance.

Another and more specific object is to provide a means whereby the force between two cables carrying current in opposite directions is restrained so as to prevent relative motion between conductors and consequent rapid wear of the cables and their connections.

A further object of the invention is to provide a means for producing a portable resistance welding system which is capable of welding aluminum with the least power demand from the power supply line.

With these and various other objects in view, the invention may consist of certain novel features of construction and operation as will be more fully described and particularly pointed out in the specification, drawings and claims appended thereto.

In the drawings which illustrate an embodiment of the device and wherein like reference characters are used to designate like parts, FIG. 1 is a drawing in perspective of a portable DC resistance welding machine which incorporates the secondary structure of the present invention.

FIG. 2 is a cross-sectional view of the flexible cable in accordance with the invention.

Figure 3:
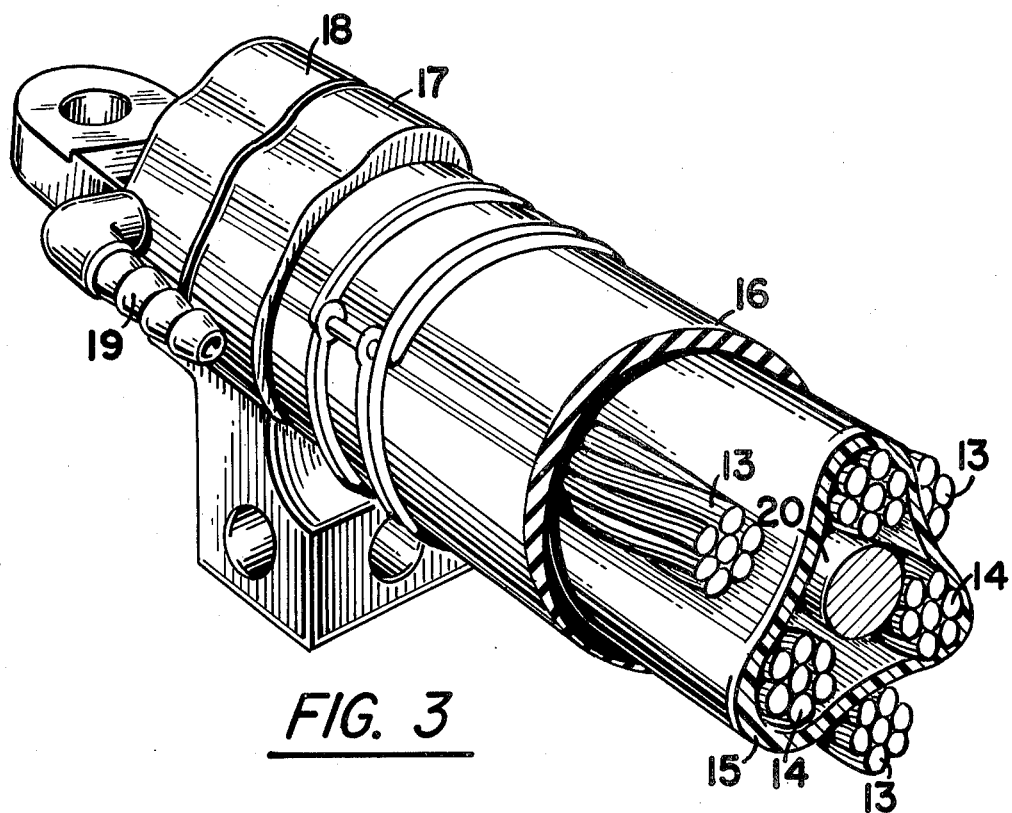
FIG. 3 is a cross-sectional view of a conventional flexible cable as used in single phase portable resistance welding machines.

FIG. 1 illustrates a portable DC resistance welding gun welder which incorporates the elements of the present invention. The welding gun 1 consists of a C frame structure 2 which supports a fixed electrode holder 3 and a movable electrode holder 4 to which are affixed replaceable water-cooled welding electrodes 5. The movable electrode holder and its electrode or "tip" is caused to move along a line passing through the longitudinal axis of the electrode holders by means of a fluid powered force actuator 6 which includes a cylinder, piston and piston rod to which is attached the movable electrode holder 4. The cylinder has two chambers, one on either side of the piston, which communicate to ports connected to a source of fluid under pressure which may be regulated. By introducing fluid at a desired pressure to the chamber at the top side of the piston, the piston carrying the upper electrode holder 4 and its welding tip is caused to move toward the lower electrode until the tips 5 come together with the work pieces / to be welded under the desired force between the electrodes at the spot which is to be welded. When, after the spot has been welded, the fluid is removed from the upper chamber of the cylinder and fluid caused to enter the lower chamber, the electrodes will separate and the work will be released.

Figure 4:
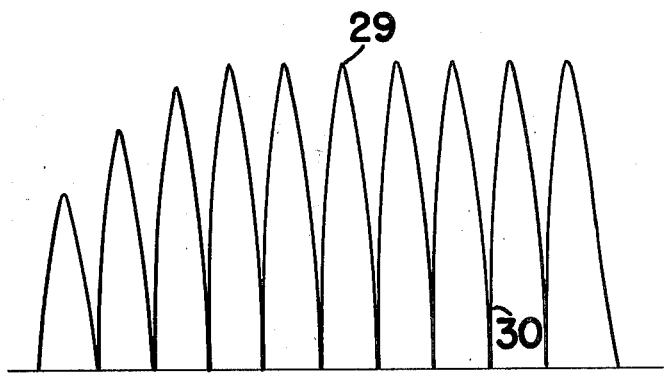
FIG. 4 illustrates the secondary current wave form when using a kickless cable of the traditional type.

Transformer 8 is a single phase or polyphase welding transformer whose primary is connected to the power supply line of the plant and whose secondary terminals 9 are connected to the input terminals of a rectifier assembly 10 which has DC output terminals 12 to which the flexible cable assembly 11 is connected. Two terminals 13 at the opposite end of this cable which may be 8 to 10 or more feet in length are connected to the electrode holders of a resistance welding gun. When the primary of the welding transformer is energized by means of the conrol 31, a low voltage alternating current will be fed to the rectifier assembly 10 and unidirectional current will flow from one of the output terminals 12 of the rectifier through one of the conductors included in flexible cable 11 through the frame of the welding gun and the work between the electrodes and return through the second conductor of the flexible cable 11 to the second terminal of the rectifier 10. It has been found that if the ordinary kickless flexible cable, as traditionally utilized on portable welding machines, is utilized with the transformer-rectifier arrangement, a secondary current with 100 percent ripple, as illustrated in FIG. 4, is obtained. The welding current in this case consists of a series of pulses at the rate of 120 pulses per second if the power supply line is 60 cycles and full wave rectification is utilized, each pulse rising to some peak value and dropping to zero in a period of 120th of a second. A wave form of this type is very inefficient especially in the welding of aluminum or other material of high thermal conductivity since the heat developed during the peak portion 29 of each pulse is conducted away from the weld area during those portions of the wave 30 when the current is close to zero. It was discovered that a wave form of the type shown in FIG. 4 was obtained because of the fact that the kickless cables traditionally utilized in portable guns are constructed in the manner illustrated in FIG. 3. This type of kickless cable constructed in accordance with U.S. Pat. No. 2,247,133, is an assembly of six individual flexible copper conductors wound in the form of a helix about a flexible core 20. Alternate conductors are separated by a seamless synthetic tube 15 and oil and wear resistant rubber hose 16 encases the assembly of conductors and core. The three conductors 13 outside the separator 15 have one polarity and are connected together at one of the terminal structures 1/. The three conductors 14 inside the separator 15 are of opposite polarity and are connected to the second terminal 18. Cooling water is admitted into the cable through fitting 19 which is fastened to a port having connection to the inside of the cable. Cables of this type have an extremely low inductance because of the proximity of the conductors to one another and because of the helical twist of the conductors which approximates a twisted pair.

Figure 5:
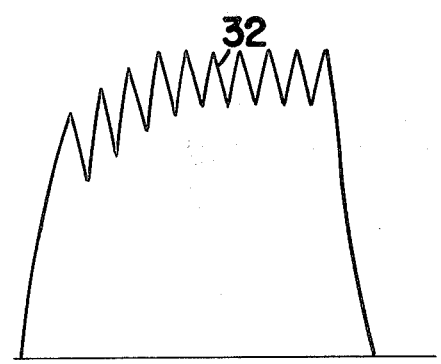
FIG. 5 illustrates the secondary current wave form when using a cable constructed in accordance with the invention.

In an attempt to filter the direct current and reduce the high ripple the core about which the conductors were placed was constructed of a bundle of iron wires and iron structures were placed around the exposed secondary portions of the transformer. These measures, however, were ineffective because the iron became saturated because of the strong magnetic field developed by the high current. The cable illustrated in FIG. 2 was devised and tests made on a portable DC welding gun arrangement furnished with a flexible cable constructed as per FIG. 2 showed that the ripple was greatly reduced from the ripple obtained with the traditional kickless cable. FIG. 5 illustrates the wave form of the secondary current which shows the reduced ripple 32 obtained when a cable constructed in accordance with the present invention is utilized on a portable gun welder.

FIG. 2 is a cross-sectional drawing showing the construction of the flexible cable made in accordance with the present invention. Two separate single conductor heavy duty water cooled conductors 20 are enclosed in a strong canvas restraining sleeve 21 and maintained at a pre-determined distance from one another by means of separators 22 which are fixed between the cables at several points along the cable assembly. The canvas sleeve is provided with grommets 23 by which diametrically opposite sections of the sleeve are fastened together along the length of the sleeve so as to form two openings into which the two separate cables may be inserted. The separators 22 are then installed centered over each grommet 23 and secured in place by means of aluminum machine bolts 24, nuts 25 and washers 26. A cable constructed in this manner and suitable for the welding of 1/10 inch aluminum, which requires 51,000 amperes of welding current at a duty cycle of 10 percent, would be constructed with two separate cables 20 each having a cross sectional copper area of 750,000 circular mills. A cable of this size would be constructed with a hollow core 27 in its center made of a material which is spiralled so as to form a long tubular structure over which several stranded conductor sections 33 would be placed in a long helix, the copper wire and core assembly then being installed in a sturdy rubber tubing 28. Terminals 13 soldered to the end of the conductors provide means for connection to the transformer and the gun and also provide means for passing water through the center core and conducting wires of the cable for the removal of heat developed from the current flowing through the conductors. Secondary cables constructed in this manner are much more flexible and easier to handle than flexible cables of the kickless non-inductive type of the conventional type traditionally used for portable welding equipment. The reason for this can be understood if we examine the dimensions of the one cable as against the other. The cable made in accordance with the invention and having a cross sectional copper area of 750,000 circular mills in each conductor has an outside diameter of 1-13/16 inches. A cable of the kickless type in which both the positive and the negative conductor are installed in one rubber tube would have a diameter of 2-13/16 inches. Inasmuch as the stiffness of a conductor is proportional to the third power of its diameter the stiffness of the kickless low reactance type cable would be 3.75 times stiffer than the cable constructed in accordance with the present invention. Because of the great stiffness of the old style cable it would be impractical to use in a production setup where the cable would have to be manipulated by the operator in order to weld different parts of the work piece. Cables constructed in accordance with the present invention have much greater flexibility and utility and could easily be handled by a welding operator without causing undue fatigue and stress upon the operator. This advantage to the operator in using the cable of the present invention, in addition to the advantages of the lower peak current requirement because of the lessened ripple, and the stability of the conductors one with respect to the other, due to the restraining effect of the canvas sleeve and spacers, are illustrative of the advance made by the present invention and indicate its great utility.

In the past designers of portable resistance welding equipment have taken great pains in designing equipment in order to reduce the reactance in the secondary circuit and thus increase the power factor of the resistance welding machine. The present invention, although running counter to established practice in the resistance welding art by purposely increasing the inductance in the secondary circuit, has, however, resulted in a welding machine having better welding characteristics and lower power demand than previous portable resistance welding gun equipment.

What I claim is:

1. A flexible cable having terminals at one end for connection to a source of direct current and terminals at the opposite end suitable for connection to a portable resistance welding gun, the said flexible cable comprising:

a pair of water-cooled flexible conductors fitted with the said terminals at each end, each conductor encased in a flexible impermiable insulating sleeve whose ends are sealed to their respective terminals, with each conductor having at its center a hollow core through which water may be circulated;

an additional flexible sleeve surrounding the said pair of water-cooled conductors;

separate means, distributed along the length of the said additional flexible sleeve for maintaining the said conductors within the said sleeve at a fixed distance from one another while allowing the said cable assembly to bend about any line passing diametrically through and normal to both conductors, comprising pairs of flat rectangular plates which form a sandwich assembly with portions of the material of the additional flexible sleeve surrounding both conductors, the said assembly being fastened by a bolt through each of said pairs of plates and the sleeve material between the said plates.

* * * * *